United States Patent
Schwan

(10) Patent No.: US 9,062,718 B2
(45) Date of Patent: Jun. 23, 2015

(54) CONNECTION OF A SHAFT TO A MOUNTING PART

(75) Inventor: Tobias Schwan, Wiesloch (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 124 days.

(21) Appl. No.: 13/256,037

(22) PCT Filed: Mar. 9, 2010

(86) PCT No.: PCT/EP2010/001445
§ 371 (c)(1),
(2), (4) Date: Sep. 12, 2011

(87) PCT Pub. No.: WO2010/102775
PCT Pub. Date: Sep. 16, 2010

(65) Prior Publication Data
US 2012/0003037 A1    Jan. 5, 2012

(30) Foreign Application Priority Data

Mar. 12, 2009   (DE) .......................... 10 2009 012 479

(51) Int. Cl.
*F16B 21/10* (2006.01)
*F16D 1/08* (2006.01)
*F16D 1/06* (2006.01)

(52) U.S. Cl.
CPC ............ *F16D 1/0835* (2013.01); *Y10T 403/70* (2015.01); *F16D 2001/062* (2013.01)

(58) Field of Classification Search
CPC ................................. F16B 21/00; F16B 21/10
USPC ......... 403/277, 279, 280, 281, 282, 367, 368, 403/274, 365
See application file for complete search history.

(56) References Cited

U.S. PATENT DOCUMENTS 1,941,289 A * 12/1933 Bedford ..................... 403/365
2,082,379 A   6/1937 Brittain
(Continued)

FOREIGN PATENT DOCUMENTS

| CA | 2 155 099 | 6/1995 |
| DE | 688 397 | 2/1940 |

(Continued)

OTHER PUBLICATIONS

International Preliminary Report on Patentability, issued in corresponding International Application No. PCT/EP2010/001445.

(Continued)

*Primary Examiner* — Michael P Ferguson
(74) *Attorney, Agent, or Firm* — Kenyon & Kenyon LLP

(57) ABSTRACT

In a connection of a shaft to a mounting part, in particular a shaft-hub connection, the shaft has a first axial region which is able to be accommodated in the mounting part, the shaft has an additional axial region which has a larger diameter than in the first axial region, a transition region is provided between the first and additional axial region, whose diameter increases in the axial direction from the first to the additional axial region, from the value of the diameter of the first axial region to the value of the diameter of the additional axial region, in particular not exclusively abruptly, a bushing is provided between the shaft and the mounting part, the bushing having an axial region, in particular an axial terminal region, which is elastically deflectable by the transition region such that it is pressed against the wall of the mounting part, in particular when the shaft is inserted into the mounting part.

17 Claims, 2 Drawing Sheets

(56) References Cited

U.S. PATENT DOCUMENTS

| | | | |
|---|---|---|---|
| 2,125,552 A | | 8/1938 | Feldhoff |
| 3,030,850 A | | 4/1962 | Minor et al. |
| 3,341,261 A | * | 9/1967 | Fenlin ............................ 403/277 |
| 3,973,789 A | * | 8/1976 | Kunz et al. ..................... 403/243 |
| 4,652,168 A | | 3/1987 | Brandenstein |
| 5,078,294 A | | 1/1992 | Staubli |
| 5,713,246 A | * | 2/1998 | Thoolen ......................... 403/367 |
| 5,836,825 A | | 11/1998 | Yamane |
| 6,190,263 B1 | * | 2/2001 | Kimoto et al. ................. 464/181 |
| 6,318,940 B1 | | 11/2001 | Mitts |
| 6,971,177 B2 | * | 12/2005 | Ozawa et al. .................. 403/280 |
| 7,442,127 B2 | * | 10/2008 | Kai et al. ....................... 464/181 |
| 7,563,050 B2 | * | 7/2009 | Strait ............................. 403/365 |
| 2003/0210842 A1 | * | 11/2003 | Tajima et al. .................. 384/544 |

FOREIGN PATENT DOCUMENTS

| | | |
|---|---|---|
| DE | 37 11 163 | 10/1988 |
| DE | 38 31 523 | 3/1990 |
| DE | 196 54 552 | 7/1997 |
| DE | 694 29 911 | 9/2002 |
| EP | 0 447 790 | 9/1991 |
| FR | 2 571 105 | 4/1986 |

OTHER PUBLICATIONS

International Search Report, issued in corresponding International Application No. PCT/EP2010/001445.

Written Opinion, issued in corresponding International Application No. PCT/EP2010/001445.

* cited by examiner

CONNECTION OF A SHAFT TO A MOUNTING PART

FIELD OF THE INVENTION

The present invention relates to a connection of a shaft to a mounting part.

In the case of shaft-hub connections, a shaft is provided, which is inserted into a recess of the hub, i.e., the mounting part.

SUMMARY

Example embodiments of the present invention provide a shaft-hub connection.

Among features of example embodiments of the present invention in the connection are that the connection is provided for connecting a shaft to a mounting part, in particular a shaft-hub connection, the shaft having a first axial region which is able to be accommodated in the mounting part, the shaft having an additional axial region which has a larger diameter than in the first axial region, a transition region being provided between the first and the additional axial region, whose diameter increases in the axial direction from the first axial region to the additional axial region, from the value of the diameter of the first axial region to the value of the diameter of the additional axial region, in particular not exclusively abruptly, a bushing being provided between the shaft and mounting part, the bushing having an axial region, in particular an axial terminal region, which is elastically deflectable by the transition region, in particular when the shaft is inserted into the mounting part, such that it is pressed against the wall of the mounting part.

This is advantageous in the event that alignment differences or offsets exist between the axes of the shaft and the hub; flexing motions may then occur in response to a rotary motion of the shaft-hub connection, but they are able to be compensated by the bushing. This reduces the wear and also corrosion, in particular also contact corrosion.

It is also advantageous that the elastic deflection is able to be brought about via a transition region which is easy to produce, so that only a thinner region of the wall of the bushing is to be provided in the particular region that is adjacent after insertion. An elastically deformable region is able to be produced on the bushing with the aid of the thinner region, which allows a friction-locked connection to be established between the bushing and mounting part in an uncomplicated manner. As an alternative, the elastically deformable region of the bushing is also able to be produced without a thinner region, in which case a radially inwardly directed protuberance is used instead. As a result, the elastically deformable region between an area of the shaft and an area of the mounting part is deformable and/or compressible, and the friction-locked connection is able to be realized in such a manner.

In example embodiments, the diameter of the shaft in the first axial region is selected such that the shaft is able to fit precisely inside the bushing. This has the advantage that low force may be used when inserting the shaft into the bushing, at least initially. The force required for the insertion increases only when the transition region comes into contact with the elastic region of the bushing.

In example embodiments, the outer diameter of the bushing in an axial region of the bushing surrounding the first axial region of the shaft is selected such that the bushing is able to fit precisely into the mounting part. This has the advantage that the bushing is able to be inserted into the mounting part using little force, in particular prior to introducing the shaft.

In example embodiments, the transition region includes at least one subregion in which the diameter increases strictly monotonously as a function of the axial length. This has the advantage of allowing a continuously increasing deflection of the elastic region of the bushing with increasing insertion in the axial direction.

In example embodiments, the transition region includes at least one subregion in which the diameter increases as a function of the axial length of a circular function or an elliptic function. This offers the advantage of a particularly uncomplicated production since the programming of a circle is implementable in an especially simple and rapid manner. When using an elliptic function, the axial displacement region required for attaining a specific deflection, and thus a force for the friction-locked connection, is able to be increased.

In example embodiments, the edges on the axial terminal region of the bushing are beveled. This has the advantage of allowing an uncomplicated production, and of facilitating the mounting.

In example embodiments, the bushing is substantially arranged in the form of a hollow cylinder. This has the advantage of allowing a cost-effective and uncomplicated production.

In example embodiments, the bushing is made of Teflon. This advantageously reduces the contact corrosion; in addition, the bushing is able to compensate circumferentially directed flexing motions in case of misalignments of the imaginary center axes of the shaft and the mounting part.

In example embodiments, the shaft and the mounting part are made of steel or aluminum. This has the advantage that direct contact between the shaft and the mounting part within the recess of the mounting part is prevented by the bushing.

In order to arrange the elastically deflectable region, in example embodiments, the wall thickness of the bushing is thinner than in a further region that surrounds the first axial region of the shaft once the shaft has been inserted in the mounting part. This offers the advantage that the elastic region is able to be produced in a simple and cost-effective manner.

In example embodiments, the fact that the axial region of the bushing is pressed against the wall of the mounting part produces perpendicular forces relative to the wall such that correspondingly high torques are able to be transmitted between the shaft and mounting part, through the bushing. This has the advantage of producing a strong, friction-locked connection.

In example embodiments, the outer diameter of the bushing is implemented such that it matches the inner diameter of the corresponding recess of the mounting part precisely. This has the advantage that low force is required to introduce the bushing into the mounting part, and that the elastic region is deflectable and/or deformable following the introduction of the shaft into the recess of the bushing, so that high torques are able to be transmitted as a result.

In example embodiments, the outer diameter of the shaft in the first axial region is implemented to produce a precise fit with the inner diameter of the corresponding recess of the bushing. This has the advantage that low force is usable when the first axial region is inserted into the bushing. Only after the transition area has made contact with the elastic region of the bushing will greater press-fit force be required.

In example embodiments, the shaft is connected to the rotor shaft of an electromotor, or it is integrally formed there-with. This offers the advantage that a virtual linkage to the mounting part is able to be realized with the aid of the bushing. Axial offsets or differences in the axial orientation, in particular, are able to be compensated with the aid of the bushing.

In example embodiments, the mounting part is a transmission component of a transmission provided between an engine and a gear train, or it is a component that is part of a gear train. This has the advantage of allowing use in different systems, machines or plants.

LIST OF REFERENCE NUMERALS 1 mounting part, hub
2 bushing
3 shaft
4 elastic region
5 transition region Example embodiments of the present invention are explained in greater detail with reference to the appended Figures.

DETAILED DESCRIPTION

Figure 1:
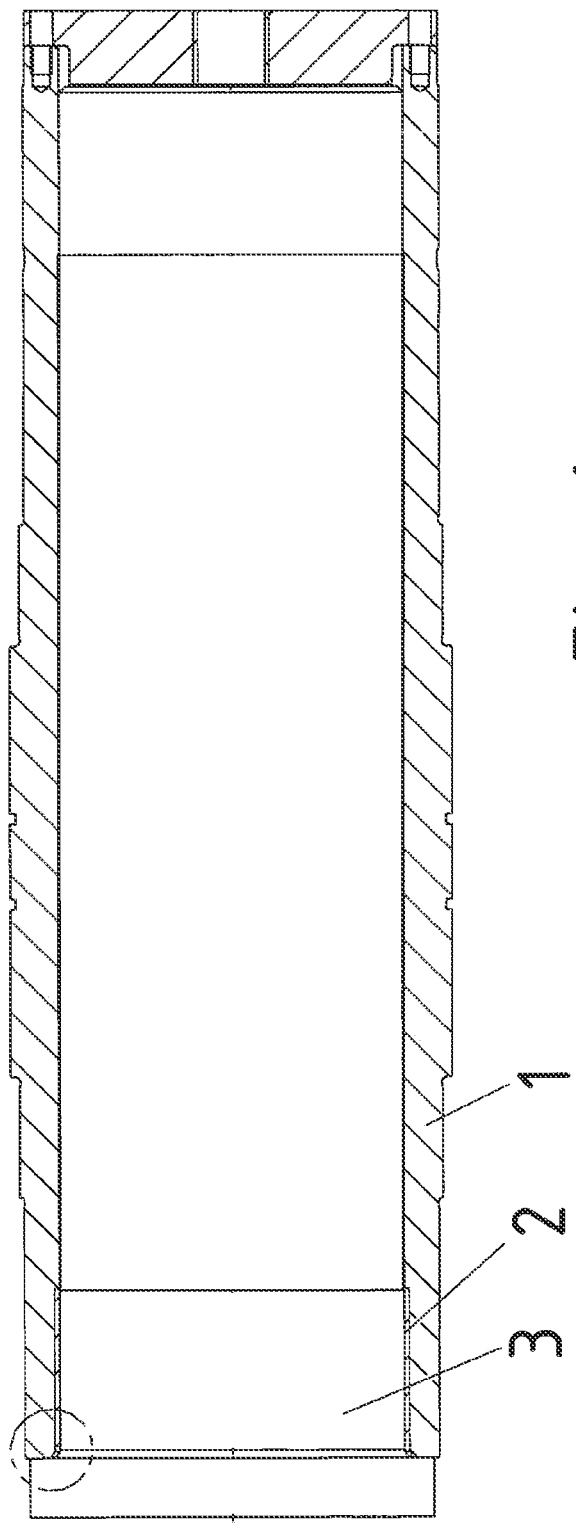
FIG. 1 shows a shaft-hub connection according to an example embodiment of the present invention.
Figure 5:
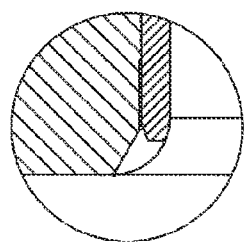
FIGS. 2 through 5 show enlarged cutaway views of individual variants.
Figure 4:
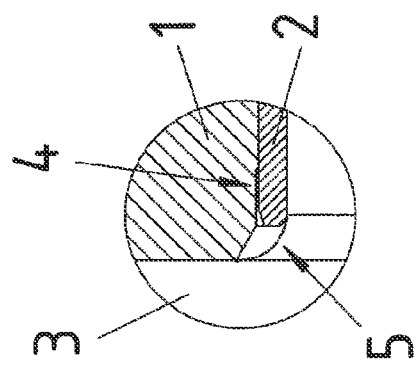
Figure 3:
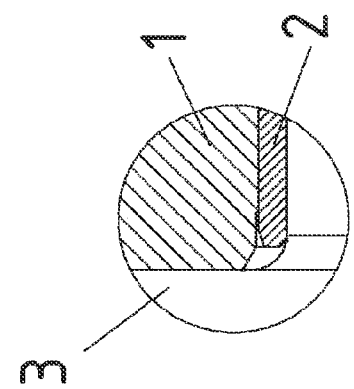
Figure 2:
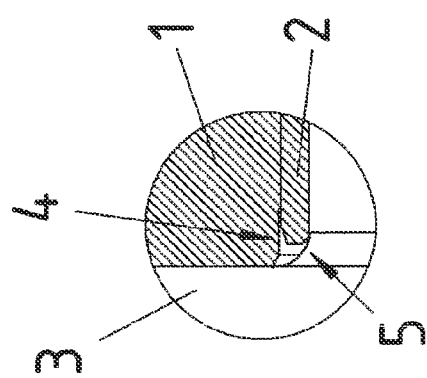

Mounting part 1 has a cylindrical recess in which a bushing is provided. The edge of the recess of mounting part 1 is beveled. Bushing 2 is to be inserted into the cylindrical recess. With the exception of an axial edge region, the outer diameter of bushing 2 has been selected to match the inner diameter in mounting part 1 precisely.

Bushing 2 is substantially arranged in the form of a hollow cylinder.

Bushing 2 in turn has a cylindrical recess on its radially inner surface, so that is it able to accommodate a shaft 3 which has a cylindrical design in the mounting area.

Shaft 3 is provided with a step. The diameter of shaft 3 in a first axial region, which is situated in the area of the mounting part once shaft 3 has been introduced, is selected to fit the inner diameter of bushing 2 precisely.

The diameter of shaft 3 in an additional axial region, which is not located in the mounting part once shaft 3 has been introduced into mounting part 1 has a larger size than the inner diameter of the mounting part.

The step provided between the first and the additional axial region is implemented by a radius. This means that the diameter increases according to a circular function starting from the first axial region to the additional axial region and increases abruptly following a central angle of 90°, to the value of the outer diameter of the additional axial region.

In its axial terminal region facing the additional region, bushing 2 has an elastically deformable area which preferably has a thinner wall thickness. Thus, this region is able to be pressed against the inner wall of the mounting part by the radius, so that a friction-locked connection is produced.

The axially projecting edges of bushing 2 are beveled. The bevels at the outer edge and the inner edge of the bushing enhance the elasticity of the deformable region. In addition, the bevel at the outer edge is able to be implemented in flat form such that a further region is available for the friction-locked connection. In other exemplary embodiments, this bevel is implemented in flat form such that it extends essentially across the entire elastically deformed region.

It is especially advantageous to provide an angular dimension of approximately 30° of the circular function for the deflection of the elastic region of bushing 2. In other words, the axial end of the bushing is situated at this point of the circular function once the shaft component, i.e., the shaft, has been inserted into the recess of the bushing.

When the shaft region is inserted, the shaft moves farther into the mounting opening, i.e., the recess, of the bushing, until the radius section is contacting the elastic region of bushing 2 and deflects it to an increasing extent in the further course of the axial insertion. Accordingly, the perpendicular forces acting between bushing 2 and mounting part 1 become greater, so that a high frictional grip in relation to the rotary motion is possible in the circumferential direction. As soon as the elastic region of the bushing has been deflected to a maximum extent, that is to say, as soon as the elastic region rests against the wall of the recess of the mounting part, no further deflection is possible, and a further insertion compresses the wall of bushing 2.

High torques are consequently able to be transmitted from the shaft via the bushing, to the mounting part or vice versa, by the high frictional forces.

The bushing is preferably made of a material that is tribologically paired in advantageous manner with the contacting materials. Teflon is used for example. As a result, high elastic deflections are possible on the one hand, and high frictional forces are achievable and thus high torques are transmittable between shaft and mounting part, on the other. Moreover, contact corrosion between the mounting part and shaft is prevented.

In exemplary embodiments, the bushing is injection-molded in the mounting part, or extrusion-coated or provided in integral fashion in some other manner. Thus, there is no need to insert the bushing into the mounting part. When the bushing is produced by injection-molding or extrusion-coating, the elastic region is able to be produced in such a way that a ring, i.e., a thin hollow cylinder, is provided in the axial terminal region of the mounting part, and the injection-molding or extrusion-coating operation is carried out subsequently. The material of the ring is selected such that the plastic used for the injection-molding or extrusion-coating does not adhere to the ring after curing, so that the ring is then able to be removed.

In exemplary embodiments, it is possible to select a different increasing function instead of a section having a circular function. The essential idea is that no steep abrupt change is provided, but a monotonous, preferably strictly monotonous, increase is provided in the region of the friction-locked connection to the bushing.

The invention claimed is:
1. A connection system, comprising:
a cylindrical shaft;
a mounting part having a cylindrical recess; and
an annular bushing arranged entirely between the shaft and the mounting part and positioned in the cylindrical recess of the mounting part;
wherein the shaft includes a first axial region accommodatable in the mounting part;
wherein the shaft includes an additional axial region having a larger diameter than the first axial region;
wherein a transition region is provided between the first axial region and the additional axial region, the transition region having a diameter that is filleted from the first axial region to the additional axial region in an axial direction, from a value of a diameter of the first axial region to a value of the diameter of the additional axial region;

wherein the bushing includes an axial terminal region, which is elastically deflectable by the transition region and located between the transition region of the shaft and a wall of the cylindrical recess of the mounting part, when the shaft is inserted into the mounting part, such that the axial terminal region is pressed against the wall of the mounting part; and wherein an outer edge in the axial terminal region of the bushing is beveled, the beveled outer edge facing the wall of the cylindrical recess.

2. The connection system according to claim 1, wherein the connection is arranged as a shaft-hub connection.

3. The connection system according to claim 1, wherein the diameter of the shaft in the first axial region is selected such that the shaft is fittable into the bushing.

4. The connection system according to claim 1, wherein an outer diameter of the bushing in an axial region of the bushing surrounding the first axial region of the shaft is selected such that the bushing is fittable into the mounting part.

5. The connection system according to claim 1, wherein the transition region includes at least one subregion in which the diameter increases constantly as a function of axial length.

6. The connection system according to claim 1, wherein the transition region includes at least one subregion in which the diameter increases accordingly, (a) as a function of an axial length of a circular function or (b) as a function of an elliptic function.

7. The connection system according to claim 1, wherein an inner edge in the axial terminal region of the bushing is beveled.

8. The connection system according to claim 1, wherein the bushing is arranged substantially in the form of a hollow cylinder.

9. The connection system according to claim 1, wherein the bushing is made of Teflon.

10. The connection system according to claim 1, wherein the shaft and the mounting part are made of (a) steel or (b) aluminum.

11. The connection system according to claim 1, wherein the axial terminal region of the bushing has a thinner wall thickness than in a further region of the bushing that surrounds the first axial region of the shaft once the shaft is inserted into the mounting part.

12. The connection system according to claim 1, wherein perpendicular forces relative to the wall are provided by the axial region of the bushing being pressed against the wall of the mounting part, such that correspondingly high torques are transmittable between the shaft and mounting part, through the bushing.

13. The connection system according to claim 1, wherein an outer diameter of the bushing is adapted to match an inner diameter of a corresponding recess of the mounting part.

14. The connection system according to claim 1, wherein an outer diameter of the shaft in the first axial region is adapted to match an inner diameter of a corresponding recess of the bushing.

15. The connection system according to claim 1, wherein the shaft is (a) connected to or (b) integrally formed with a rotor shaft of an electromotor.

16. The connection system according to claim 1, wherein the mounting part includes (a) a transmission component of a transmission provided between an engine and a gear train or (b) a component that is part of a gear train.

17. A connection system, comprising:

a cylindrical shaft;

a mounting part extending a length of the shaft and having a cylindrical recess at an end of the shaft; and an annular bushing having a length less than a length of the mounting part, arranged between the end of the shaft and the mounting part, and positioned in the cylindrical recess of the mounting part;

wherein the shaft includes a first axial region accommodatable in the mounting part;

wherein the end of the shaft includes an additional axial region having a larger diameter than a diameter of the first axial region;

wherein a transition region is provided between the first axial region and the additional axial region of the shaft, the transition region having a diameter that is filleted from the first axial region to the additional axial region in an axial direction, from a value of the diameter of the first axial region to a value of the diameter of the additional axial region;

wherein the bushing includes an axial terminal region, which is elastically deflectable by the transition region and located between the transition region of the shaft and a wall of the cylindrical recess of the mounting part, when the shaft is inserted into the mounting part, such that the axial terminal region is pressed against the wall of the cylindrical recess of the mounting part; and wherein an outer edge in the axial terminal region of the bushing is beveled, the beveled outer edge facing the wall of the cylindrical recess.

\* \* \* \* \*